United States Patent [19]
Harwath

[11] Patent Number: 5,316,457
[45] Date of Patent: May 31, 1994

[54] GEAR PUMP WITH IMPROVED GEAR/SHAFT RETENTION

[75] Inventor: Frank L. Harwath, Rockford, Ill.

[73] Assignee: Suntec Industries Incorporated, Rockford, Ill.

[21] Appl. No.: 59,299

[22] Filed: May 11, 1993

[51] Int. Cl.⁵ .................................................. F04C 2/00
[52] U.S. Cl. .................................. 418/171; 418/166; 403/355; 403/358
[58] Field of Search ............... 418/166, 167, 168, 169, 418/170, 171; 403/278, 355, 356, 358

[56] References Cited

U.S. PATENT DOCUMENTS

| | | | |
|---|---|---|---|
| 3,619,089 | 11/1971 | Pierrat | 418/171 |
| 4,171,939 | 10/1979 | Harwath | 418/170 |
| 4,391,580 | 7/1983 | Hunsberger et al. | 431/1 |
| 4,432,712 | 2/1984 | Eienmann | 418/171 |
| 4,685,871 | 8/1987 | Harwath | 418/206 |
| 4,728,271 | 3/1988 | Harwath | 418/9 |
| 4,958,997 | 9/1990 | Harwath | 418/171 |

*Primary Examiner*—Richard A. Bertsch
*Assistant Examiner*—Charles G. Freay
*Attorney, Agent, or Firm*—Leydig, Voit & Mayer

[57] ABSTRACT

A gear pump in which a gear is secured to a shaft by a press fit and by a key which fits into a slot in the shaft. The key includes radially projecting ears which fit into keyways in the bore of the gear, the keyways having bottoms facing axially toward the bottom of the slot. A hot upset at the free end of the shaft clamps the key axially between the bottom of the slot and the bottom of the keyways. When the shaft/gear/key subassembly is assembled with the body and the end plate of the pump, the gear retention elements described above coact to positively prevent the shaft from being pulled out of the body and from being thrust inwardly into contact with the end plate.

3 Claims, 2 Drawing Sheets

GEAR PUMP WITH IMPROVED GEAR/SHAFT RETENTION

BACKGROUND OF THE INVENTION

This invention relates generally to a gear pump and, more particularly, to a gear pump which is especially adapted to supply pressurized liquid fuel to an oil burner. Gear pumps of this general type are disclosed in Harwath U.S. Pat. Nos. 4,171,939; 4,685,871; 4,728,271; and 4,958,997 and in Hunsberger et al U.S. Pat. No. 4,391,580.

In pumps of this type, it is conventional for a spur gear to be secured to the free end portion of a rotatable drive shaft having a free end which normally is disposed in spaced opposing relation with an end plate. The shaft is supported for rotation by the pump body and the gear is located between the body and the end plate. Conventionally, the gear is secured to the shaft with a tight press fit but also is coupled to the shaft by a key which transmits torque between the shaft and the gear in the event excessive torque and wear reduce or eliminate the torque-transmitting capability of the press fit.

In the pump disclosed in the Harvath '939 patent, the key is in the form of a cylindrical pin which fits into a slot in the shaft and into keyways in the bore of the gear. The arrangement of the pin, the slot and the keyways causes the gear to engage the end plate if excessive endwise thrust is exerted on the shaft during handling or during operation and prevents the end of the shaft from impacting against and being damaged by the end plate. In the Harwath '939 arrangement, however, the shaft is capable of being pulled out of the gear in a reverse direction by an axial force sufficient to overcome the press fit between the shaft and the gear.

The shaft of the pump disclosed in the Harwath '871 patent cannot be pulled reversely out of the gear by an axial force. This is achieved by hot upsetting the end of the shaft so that the key becomes trapped between the hot upset and the axially facing ends of the keyways if a pulling force is exerted on the shaft. In this pump, however, the shaft is capable of moving toward and impacting against the end plate. Because the shaft is relatively small in diameter, the end plate area for resisting the impact also is relatively small and thus damage can result and cause the pump to lock up or otherwise fail.

SUMMARY OF THE INVENTION

The general aim of the present invention is to provide a new and improved pump of the above general type in which the gear is mounted on the shaft in such a manner as to not only prevent the shaft from being pulled reversely out of the gear but also to prevent the shaft from impacting against the end plate.

A more detailed object of the invention is to achieve the foregoing by captivating the key within the shaft with a hot upset and by positioning the keyways in the gear in such a manner that they coact with the key to prevent the shaft from impacting against the end plate.

The invention also resides in the tolerancing of the key and the keyways to permit ready assembly of the components of the pump without significantly sacrificing the integrity of the press fit between the gear and the shaft.

These and other objects and advantages of the invention will become more apparent from the following detailed description when taken in conjunction with the accompanying drawings.

DETAILED DESCRIPTION OF THE PREFERRED EMBODIMENT

Figure 1:
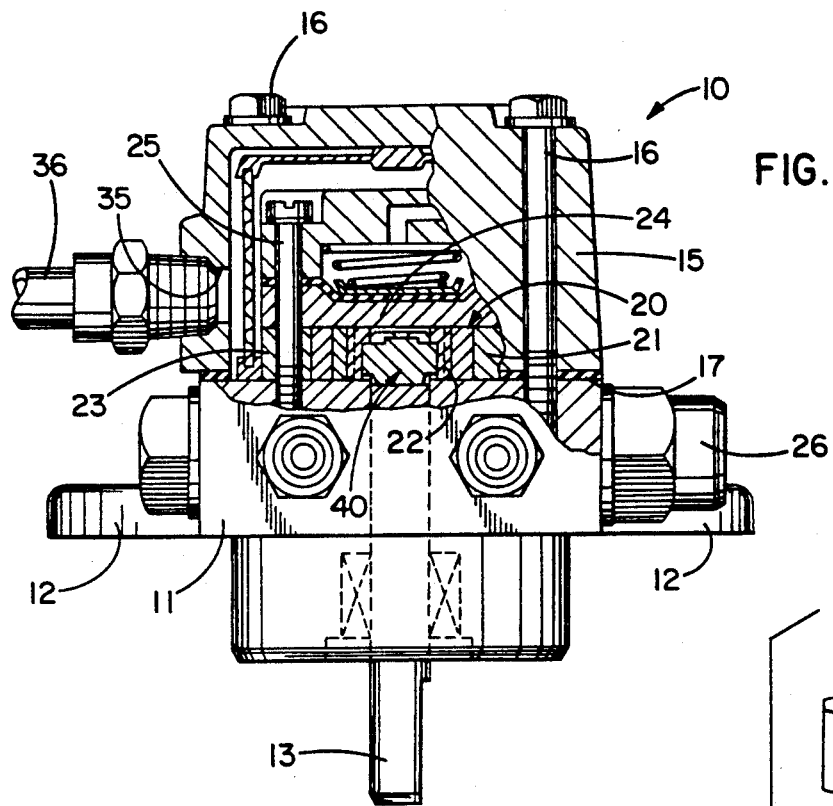
FIG. 1 is a side elevational view of a new and improved gear pump incorporating the unique features of the present invention, certain parts of the pump being broken away and shown in section.

For purposes of illustration, the invention has been shown in the drawings as embodied in a gear pump 10 of the type which is widely used for delivering fuel oil from a tank (not shown) and supplying the fuel under pressure to an oil burner (not shown). The constructional and operational features of the pump from a hydraulic standpoint are substantially identical to those of the pump disclosed in Hunsberger et al U.S. Pat. No. 4,391,580 to which reference is made for a detailed explanation of the hydraulic structure and operation of the pump.

Briefly, the pump 10 includes a body comprising a first member 11 formed by a casting having ears 12 for mounting the pump. A drive shaft 13 extends through the casting 11 and is rotatably supported in the casting. The outer end portion of the shaft projects outwardly from the outer end of the casting and is adapted to be connected to a drive motor (not shown).

Disposed in face-to-face relation with the other end of the casting 11 is a second member 15 which is generally in the form of a housing detachably secured to the casting 11 by screws 16. A gasket 17 establishes a fluid-tight seal at the interface of the casting 11 and the housing 15.

Located within the housing 15 is a gear set 20 having a ring gear 21 and a spur gear 22 identical to the gears of the pump of the aforementioned Hunsberger et al patent, the spur gear being fixed to and rotatable with the free or inner end portion of the drive shaft 13. The ring gear is surrounded by a stationary spacer 23 which is sandwiched between the casting 11 and an end plate 24. Screws 25 secure the spacer 23 and the end plate 24 to the casting 11.

When the shaft 13 is driven, the spur gear 22 of the gear set 20 is rotated and coacts with the ring gear 21 of the gear set to pressurize the fuel and to supply the pressurized fuel to an outlet or nozzle port 26 which is associated with the casting 11 and which is adapted to communicate with the oil burner. Fuel is delivered to the pump 10 by way of an inlet port 35 which is formed in the housing 15 on the side of the pump opposite the nozzle port 26 and which is connected to a supply line 36.

The spur gear 22 is attached to the free or inner end portion of the shaft 13 in a manner which in some respects is similar to the attachment arrangement disclosed in Harwath U.S. Pat. No. 4,171,939. That is, the inner end portion of the shaft is formed with a radially and axially opening slot 38 which enables the gear to be telescoped onto the shaft with a tight press fit but without splitting the gear even though there is a wide range of tolerance variations between the shaft and the gear.

Torque normally is transmitted between the shaft 13 and the gear 22 by virtue of the press fit. In addition, however, key means coact between the shaft and the gear to transmit torque if the pump 10 should require torque beyond the capability of the press fit.

In accordance with the present invention, the key means are arranged such that the shaft 13 is prevented from being pulled axially out of the body or casting 11 and, at the same time, is prevented from being pushed inwardly into impacting engagement with the end plate 24. If the shaft 13 is rammed inwardly, the gear 22 engages the end plate so that the end plate resists the impact with a relatively large surface area corresponding to that of the gear rather than that of the smaller diameter shaft.

More specifically, the key means herein comprises a flat key 40 formed with a central body 41, with a tongue 42 projecting axially from one end of the body, with a second tongue 43 projecting axially from the opposite end of the body, and with a pair of diametrically spaced ears 44 projecting radially from the body approximately midway between the two tongues. The key 40 is sized to fit in the slot 38 in the shaft 13 with the tongue 42 engaging the axially facing bottom 45 of the slot, with the tongue 43 terminating short of the free end of the shaft and with the ears 44 projecting radially outwardly from the shaft.

Figure 2:
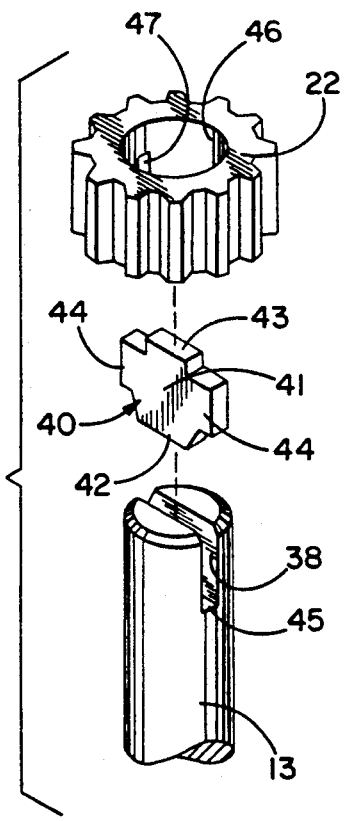
FIG. 2 is an exploded perspective view of the pump shaft, the spur gear and the key.

The bore 46 of the gear 22 is formed with two diametrically spaced keyways 47 (FIGS. 2 and 3) for receiving the ears 44. In carrying out the invention, the keyways 47 open radially into the bore 46 and also open axially out of the outer end of the gear 22. Thus, each keyway includes an end or bottom 48 which faces axially away from the free end of the shaft 13 and which faces toward the bottom 45 of the slot 38.

Figure 6:
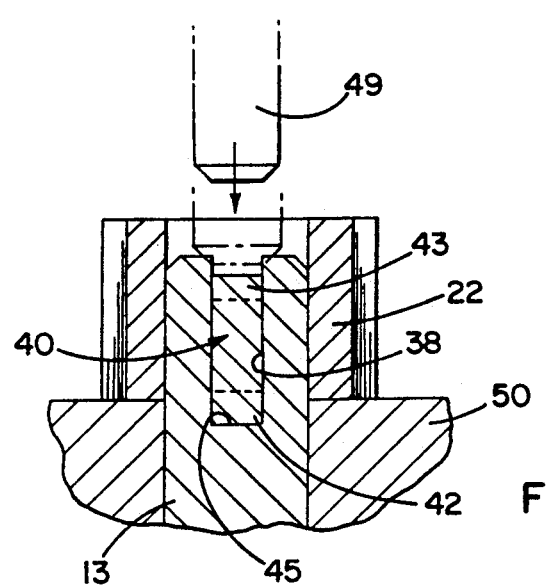
FIG. 6 is a view showing the end of the shaft being upset to hold the key in the shaft.

To assemble the gear 22 to the shaft 13, the gear is pressed onto the shaft while the key 40 is inside of the gear with its ears 44 projecting into the keyways 47. The gear is pressed onto the shaft until the tongue 42 of the key stops against the bottom 45 of the slot 38 and the bottoms 48 of the keyways 47 stop against the ears 44. Thereafter, an electrode 49 (FIG. 6) is rammed downwardly against the center portion of the inner end of the shaft as shown in FIG. 6 while the shaft and the gear are held by a fixture 50. The electrode swages the metal adjacent the open end of the slot 38 over against the tongue 43 of the key 40 and forms a hot upset 51 to captivate the key in the slot and augment the press fit in holding the gear axially on the shaft. As is apparent from FIGS. 3 and 4, the upset 51 clamps the tongue 42 of the key 40 against the bottom 45 of the slot 38 and thus there is no axial play or clearance between the key on the one hand and the slot bottom and the hot upset on the other hand.

As an alternative assembly method, the key 40 may be placed in the slot 38 of the shaft 13 and then the subassembly may be pressed into the gear 22 until the tongue 42 stops against the slot bottom 45. Thereafter, the hot upset 51 may be formed to clamp the key axially in the slot.

Figure 3:
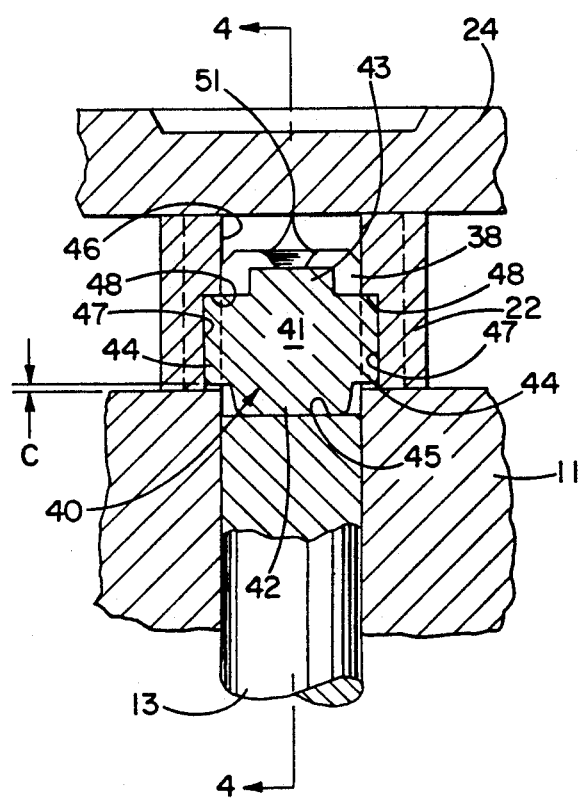
FIG. 3 is an enlarged view of certain parts shown in FIG. 1.
Figure 4:
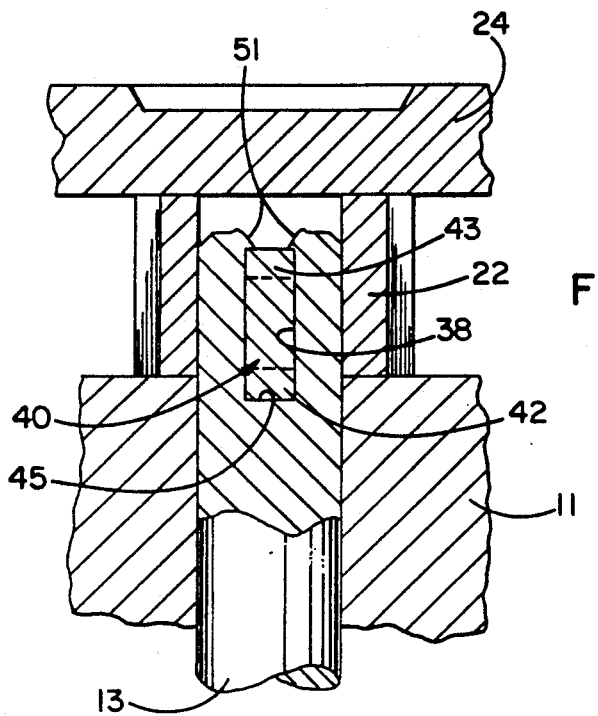
FIG. 4 is a fragmentary cross-section taken substantially along the line 4—4 of FIG. 3.
Figure 5:
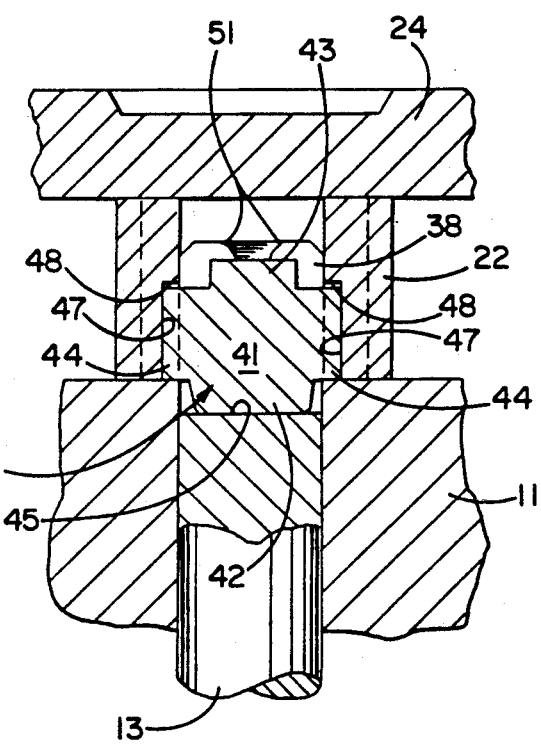
FIG. 5 is a view similar to FIG. 3 but shows certain components in moved positions.

When the shaft/gear/key subassembly is assembled with the casting 11 and the housing 15, the gear 22 is sandwiched with a small amount of axial clearance between the inner face of the casting and the opposing face of the end plate 24 (see FIG. 3). Under such circumstances, the ears 44 of the key 40 are in engagement with the bottoms 48 of the keyways 47 while the tongue 42 is in engagement with the bottom 45 of the slot 38. If inward thrust is imposed on the shaft 13, the shaft forces the key against the gear which, in turn, is forced against the end plate. The shaft, however, is held out of contact with the end plate by the key and the gear and thus the impact force is resisted by a relatively large area of the end plate.

As shown in FIG. 3, a small amount of clearance C (e.g., clearance of about 0.030") exists between the inner face of the casting 11 and the opposing ends of the ears 44, such clearance being necessary in order to accommodate tolerance variations and enable assembly of the shaft/gear/key subassembly between the casting 11 and the end plate 24. If the shaft 13 is pulled outwardly, the ends of the ears 44 engage the opposing face of the casting once the clearance C has been taken up and then, because of the hot upset 51, no further outward movement of the shaft is possible even if the press fit between the shaft and the gear 22 is overcome. Thus, the shaft is securely locked against outward removal. Because the clearance C is relatively small, the keyways 47 are no longer than necessary so as to avoid sacrificing the integrity of the press fit between the gear and the shaft.

I claim:

1. A gear pump comprising a body, an elongated shaft rotatably supported by said body and having an axially facing free end, an end plate connected to said body and disposed in spaced opposing relation with the free end of said shaft, a spur gear rotatable with the free end portion of said shaft and located between said body and said end plate, said gear having a bore receiving said shaft, a slot in said shaft and opening radially out of diametrically opposite sides of the shaft and axially out of the free end of the shaft, said slot having an axially facing bottom, a key disposed in said slot and having an axially extending tongue engaging the bottom of the slot, an upset at the free end of said shaft near the center thereof and clamping said tongue against the bottom of said slot, diametrically opposed keyways formed in said gear and aligned circumferentially with said slot, each of said keyways opening radially into said bore and opening axially out of one end of said bore, each of said keyways having a bottom facing axially toward the bottom of said slot, and said key having radially projecting ears disposed in said keyways and normally engaging the bottoms of said keyways whereby endwise thrust exerted on said shaft in a direction toward said end plate causes said key to push said gear against said plate and thereby keep the free end of said shaft out of contact with said plate, said ears being located to engage said body to prevent withdrawal of said shaft from said body when an endwise force is exerted on said shaft in a direction away from said end plate.

2. A gear pump as defined in claim 1 in which there is a small axial clearance between said ears on the one hand and said body and the bottoms of said keyways on the other hand.

3. A gear pump as defined in claim 2 in which said axial clearance is approximately 0.030".

* * * * *